United States Patent [19]

Gilmore

[11] Patent Number: 4,847,461

[45] Date of Patent: Jul. 11, 1989

[54] STACKABLE PLATE ARRANGEMENT FOR MICROWAVE DISHES

[76] Inventor: Edward V. Gilmore, 337 Beach 147 St., Rockaway Beach, N.Y. 11694

[21] Appl. No.: 119,517

[22] Filed: Nov. 12, 1987

[51] Int. Cl.[4] .......... H05B 6/64; A47J 43/00

[52] U.S. Cl. .......... 219/10.55 E; 99/448; 99/449; 99/DIG. 14; 108/93; 211/188

[58] Field of Search .......... 99/448, 449, 450, 416, 99/417, 482, 393, 396, DIG. 14; 211/194, 187, 188, 71; 108/91, 92, 93, 64, 114; 206/820; D7/327, 351, 367, 388, 403, 409; 219/10.55 E; 126/41 A, 333, 337 R, 337 A

[56] References Cited

U.S. PATENT DOCUMENTS

| | | | |
|---|---|---|---|
| D. 256,761 | 9/1980 | Martin et al. . | |
| D. 274,495 | 7/1984 | Bowen et al. . | |
| D. 281,214 | 11/1985 | Schaller . | |
| 1,401,057 | 12/1921 | Elliott | 211/188 |
| 1,814,740 | 7/1931 | Rapp | 211/188 |
| 2,529,649 | 11/1950 | Copler | 211/188 |
| 2,944,780 | 7/1960 | Monk | 211/188 |
| 3,006,292 | 10/1961 | Hilgers | 99/448 |
| 3,115,253 | 12/1963 | Malbin et al. | 211/188 |
| 3,570,798 | 3/1971 | Squibb | 211/187 |
| 3,674,229 | 7/1972 | Keeler, II | 211/188 |
| 3,684,285 | 8/1972 | Kane | 211/188 |
| 3,765,541 | 10/1973 | Madey et al. | 211/188 |
| 3,783,801 | 1/1974 | Engman | 211/188 |
| 3,831,533 | 8/1974 | Kellogg | 108/64 |
| 4,021,128 | 5/1977 | Chiames | 108/64 |
| 4,099,472 | 7/1978 | Kellogg | 211/188 |
| 4,249,464 | 2/1981 | Hansen | 99/450 |
| 4,272,663 | 6/1981 | Greene | 219/10.55 E |
| 4,452,581 | 6/1984 | Panehal . | |
| 4,455,467 | 6/1984 | Dills | 219/10.55 E |
| 4,691,088 | 9/1987 | Eke | 219/10.55 E |
| 4,713,513 | 12/1987 | Colato | 219/10.55 E |

FOREIGN PATENT DOCUMENTS

| | | | |
|---|---|---|---|
| 23827 | 2/1981 | European Pat. Off. | 219/10.55 E |
| 286431 | 2/1953 | Switzerland | 211/188 |

*Primary Examiner*—Harvey C. Hornsby
*Assistant Examiner*—Joseph S. Machuga
*Attorney, Agent, or Firm*—Henderson & Sturm

[57] ABSTRACT

A stackable plate arrangement (10) for microwave ovens (100) wherein the arrangement (10) comprises a plurality of apertured plate units (11) that are adapted to be operatively connected together at different heights by a plurality of support units (12) such that multiple food receptacles (200) may be suspended on different tiers within a microwave oven (100).

3 Claims, 1 Drawing Sheet

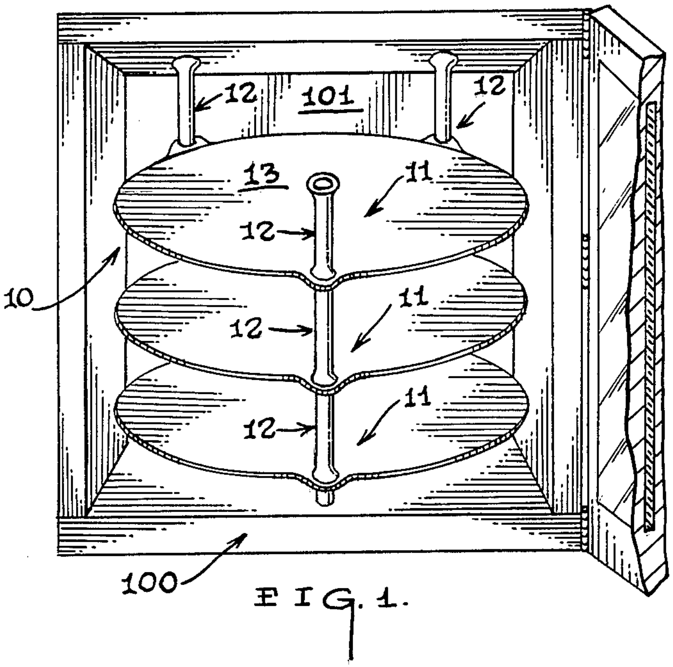
FIG. 1.
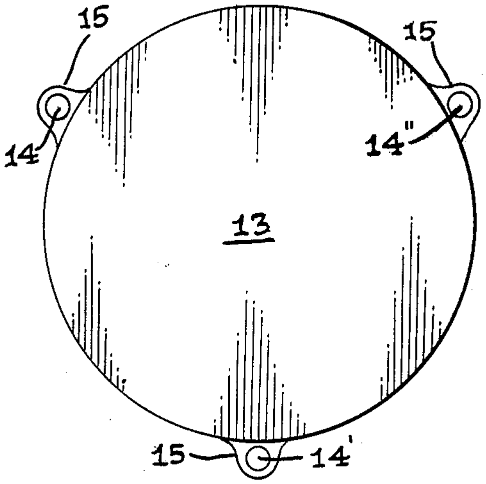
FIG. 2.
FIG. 3.
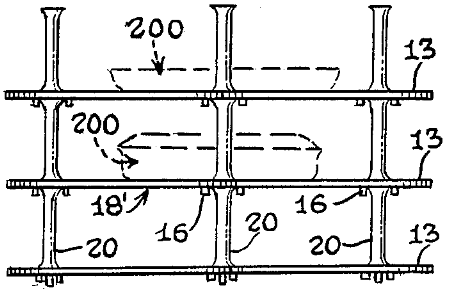
FIG. 4.
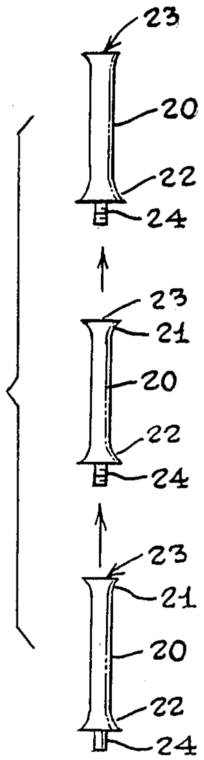
FIG. 5.
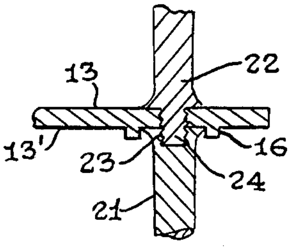

STACKABLE PLATE ARRANGEMENT FOR MICROWAVE DISHES

TECHNICAL FIELD

The present invention relates generally to the field of stackable cookware, and more specifically to a stackable arrangement for cookware designed to be employed in a microwave oven.

BACKGROUND OF THE INVENTION

This invention was the subject matter of DDP Registration No. 172470 which was filed in the U.S. Patent and Trademark Office on June 25, 1987.

As can be seen by reference to the following U.S. Pat. No's: 4,452,581; D 281,214; D 256,761; and, D 274,495 the prior art is replete with myriad and diverse stackable arrangements for cookware.

While these prior art arrangements are more than adequate for their intended purpose and function, they are also deficient in a number of areas particularly with reference to their adaptability for use in a microwave oven.

Specifically these prior art constructions are limited to individual cooking receptacles that are dimensioned, designed and configured to nest upon one another in a stacked relationship. In addition, these arrangements do not provide a series of spaced planar support surfaces which will function either as a cooking surface per se, or as a support for independent cooking receptacles of either the covered or uncovered variety.

Furthermore, all of the aforementioned stackable arrangements while admittedly convenient are bulky and occupy a large amount of useful space that cannot be otherwise utilized while the stackable arrangement is in storage.

As any frequent user of microwave ovens can attest, most of the cooking that is performed in a microwave oven involves a single food receptacle that occupies a small fraction of the capacity of the oven cavity. This particular phenomena exists primarily due to the fact that, to date no one has developed a stackable support and/or receptacle arrangement, that will permit a plurality of like or dissimilar foodstuffs to be supported at different levels within the oven to thereby utilize the full capacity thereof during the cooking process.

BRIEF SUMMARY OF THE INVENTION

The stackable plate arrangement for microwave ovens that forms the basis of the present invention comprises a plurality of apertured plate units that are operatively associated with one another by a plurality of detachable support units whereby the plate units may be supported and suspended at different heights within the interior of the cavity of a microwave oven.

In addition, the plate units are dimensioned and configured to function either as a support for an independent food receptacle or as a food tray per se; wherein, the user may have the option to cook and serve the food on the plate units; or simply use the stackable plate arrangement within the microwave oven such that independent food receptacles may be supported on the plate units during the cooking process.

Furthermore, the stackable plate arrangement of this invention is designed such that when the plate units and the support units are detached from their operative mode of disposition they will occupy a minimum amount of storage space relative to other stackable arrangements; and, the plate units can also serve as individual serving plates while the arrangement is in its disassembled mode.

It should also be appreciated that the stackable arrangement of this invention can also occupy a semi-permanent position within the cavity of the microwave oven; and, that the spacing between the plate units can be varied by removing selected plate units from engagement with the support units intermediate the upper and lower plate units.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying drawings, wherein:

FIG. 1 is a perspective view of the stackable plate arrangement of this invention disposed in a microwave oven;

FIG. 2 is an isolated top plan view of one of the plate units;

FIG. 3 is a side view of the stackable plate arrangement;

FIG. 4 is an exploded view of the support units; and,

FIG. 5 is an enlarged cross-sectional detail view of the cooperative engagement between the support units and a plate unit.

BEST MODE FOR CARRYING OUT THE INVENTION

As can be seen by reference to the drawings and in particular by reference to FIG. 1, the stackable plate arrangement that forms the basis of the present invention is designated generally by reference numeral (10) and is designed specifically to be used in the cooking cavity (101) of a conventional microwave oven (100).

The stackable plate arrangement (10) comprises in general a plurality of apertured plate units (11) and a plurality of support units (12); wherein, the support units (12) are adapted to support the plate units (11) at different heights within the cooking cavity (101) of a microwave oven (100). These units will now be described in seriatim fashion.

As can best be seen by reference to FIGS. 1 and 2, each of the plurality of apertured plate units (11) comprises an enlarged generally flat plate member (13) having a plurality of apertures (14) formed at widely spaced locations around the periphery of the plate member (13). In the preferred embodiment illustrated in FIG. 2, the plate member (13) is provided with a generally circular configuration; however, it should be appreciated that other geometric configurations such as oval, rectangular, triangular, etc. may be substituted in keeping with the teachings of this invention.

As can also be appreciated by reference to FIG. 2 in the preferred embodiment of this invention, the plate members (13) are also provided with a plurality of widely spaced discrete ear elements (15) that project outwardly from the remainder of the plate member (13); and, contain the apertures (14) that are disposed on the periphery of the plate member (13).

It should also be noted at this juncture that this invention contemplates both the use of threaded (14') and smooth walled apertures (14"); and, that the apertures (14) do not necessarily have to be formed in laterally projecting distinct ear elements (15); but, may be provided adjacent to and within the outlines of the aforementioned conventional geometrical configurations.

Regardless of the particular orientation of the apertures (14) relative to the plate member (13) as can be seen in Figs. 2 and 5, the apertures (14) are intended to be surrounded by a generally circular raised lip portion (16) formed on the bottom surface (13') of the plate member (13); wherein, the purpose and function of the raised lip portion (16) will be described in greater detail further on in the specification.

As shown in FIGS. 1, 3, and 5, the plurality of plate members (13) are adapted to operatively connected to one another by a plurality of support units (12). Each of the plurality of support units (12) comprises an elongated support leg member (20) having flared ends (21)(22); wherein, the upper end (21) is provided with a recess (23) and the lower end (22) is provided with a reduced diameter stub portion (24).

As can best be appreciated by reference to FIGS. 4 and 5, the upper recess (23) in one leg member (20) is dimensioned to engage the leg members (20) together and also capture a plate member (13) intermediate the upper and lower leg members.

As shown in FIG. 5, the apertures (14) in the plate members (13) are dimensioned to receive the stub portions (24) of the leg members (20) and the stub portions (24) are of a sufficient length to extend through the thickness of the plate member (13) and engage the recess (23) of the lower leg member (20). In addition, the upper flared end (21) of the leg members (20) are dimensioned to be received within the circular raised lip portion (16) on the underside of the plate member (13) to add lateral stability to the capturing engagement of the leg members (20) relative to the plate members (13).

Turning now to FIGS. 1 and 3, it can be seen that the plate members (13) are intended to be arranged in tiers within the microwave oven (100) by virtue of their operative engagement with the leg members (20). While a plurality of equally spaced plate members (13) are depicted in the drawings, it should also be appreciated that at least one of the intermediate plate members (13) may be removed from engagement with the leg members (20) to vary the spacing between the plate members (13).

It should also be appreciated at this juncture that the leg members (20) may either be threadedly or frictionally engaged with one another in keeping with the teachings of this invention; however, for the most part a threaded engagement between the respective leg member recess (23) and stub portions (24) is the preferred mode of cooperation for the enhanced stability of the arrangement.

It should further be appreciated that both the upper and lower groups of leg members (20) are required to operatively engage one plate member (13) above another; and, that the leg members (20) that project above a given plate member (13) serve as both keeper and handle elements relative to that plate element; in that a receptacle (200) containing foodstuffs will be limited in its lateral displacement relative to its supporting plate member (13) by the presence of the leg members (20); and, the leg members can be grasped to both insert and remove the arrangement (10) relative to microwave oven.

Having thereby described the subject matter of this invention, it should be obvious that many substitutions, modifications, and variations thereof are possible in light of the above teachings. It is therefore to be understood that the invention as taught and described herein is only to be limited to the extent of the breadth and scope of the appended claims.

I claim:

1. A stackable plate arrangement for microwave ovens wherein the arrangement consists of:

a plurality of apertured plate units; wherein, each of the plurality of apertured plate units comprise;

a generally flat plate member having a plurality of widely spaced threaded apertures formed proximate the periphery of the plate member; wherein, the underside of each generally flat plate member is provided with a plurality of integral circular raised lip portions and each of said raised lip portions surrounds one of said plurality of threaded apertures formed in each plate member; and, a plurality of support units comprising at least one upper group and at least one lower group of elongated leg members having flared ends and a recess on one end and a stub portion on the other end wherein the support units are adapted to engage one another and operatively connect said plurality of plate units together; wherein, said at least one upper group and at least one lower group of said support members are required to connect one of said plurality of apertured plate units above another of said plurality of apertured plate units; and, wherein both the recess and the stub portion of the leg members are threaded, and said circular raised lip portions of the plate units are adapted to surround the said one end of the leg members.

2. An arrangement as in claim 1 wherein said plurality of plate units may be equally spaced from one another by said operative engagement with the said plurality of support units.

3. An arrangement as in claim 1 wherein said plurality of plate units may be unevenly spaced from one another by said operative engagement with the said plurality of support units.

* * * * *